United States Patent Office 3,049,634
Patented Aug. 14, 1962

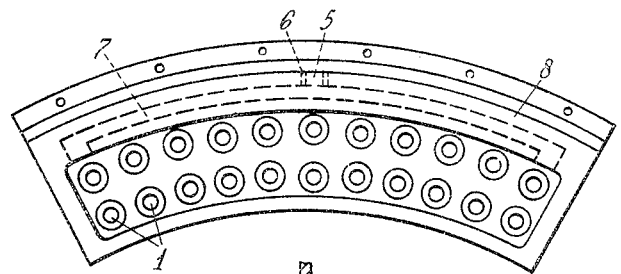
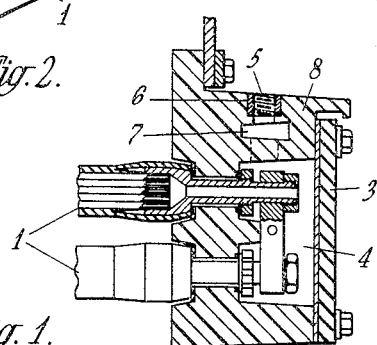
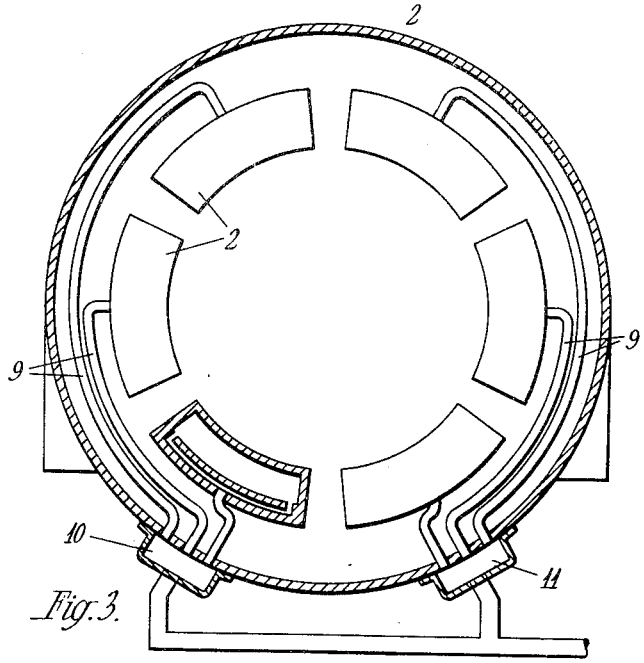

3,049,634
DYNAMO-ELECTRIC MACHINERY
William D. Horsley, Newcastle-upon-Tyne, England, assignor to C. A. Parsons & Company Limited, Newcastle-upon-Tyne, England
Filed May 5, 1959, Ser. No. 811,192
Claims priority, application Great Britain May 6, 1958
1 Claim. (Cl. 310—64)

This invention relates to dynamo-electric machines particularly turbine driven alternating current generators.

In the specification of U.S. patent Appln. No. 670,043 there has been described a dynamo-electric machine in which the stationary winding comprises hollow conductors housed in slots in a stator core, end portions of the conductors extending beyond said core at each end thereof, said end portions of the conductors being housed in a plurality of boxes of electrical insulating material, a cooling fluid being supplied to the boxes at one end of the conductors and collected in boxes situated at the other end of the conductors.

In the various forms of the invention illustrated in the said specification cooling liquid is led directly into a box by connecting the pipe containing the liquid to the box by means of a ferrule. These pipes are made of insulating material so as to provide an adequate electrical path through the cooling water from the high potential conductors to the earthed casing or to the metal pipe work in the cooling water system.

The object of the present invention is to provide a modified and more robust form of inlet suitable for the cooling fluid to the boxes of the aforesaid specification.

The invention consists in a stationary winding for a dynamo-electric machine substantially as described below and claimed in the appended claim.

Referring to the drawings accompanying this specification:

FIGURE 1 is a cross-section through a cast resin manifold box as employed in accordance with one form of the invention at the ends of liquid cooled windings;

FIGURE 2 is a front view of a manifold box with the front cover and electrical connectors removed and showing passages for the liquid in the walls of the box;

FIGURE 3 is a cross-sectional view through one end of a generator stator showing the connections for cooling liquid to the manifold boxes and showing one box in section.

In carrying the invention into effect in the forms illustrated by way of example and referring first to FIGURE 1, conductor ends 1 of a liquid cooled stator winding of an alternating current generator are supported in a plurality of cast resin manifold boxes 2 one of which is shown. The boxes are closed by removable covers 3 of electrical insulating material.

Into space 4 inside the box is introduced a cooling liquid. The conductors 1 are "hollow" and cooling liquid flows along the conductors and enters a similar manifold box at the other end of the conductors.

The term "hollow" applies to conductors either which are hollow in themselves or are in the form of strands of copper spaced apart within an enclosing tube; in both cases the cooling liquid can make direct contact with the copper; in other words the term "hollow conductors" means conductors in which cooling liquid can flow in direct contact with the conductors.

The liquid coolant, usually water, is led into the box 2 via an inlet 5 which has a cast-in ferrule 6 of either metallic or non-metallic material to which ferrule inlet or outlet pipe connections can be made.

From the inlet 5 the liquid does not flow directly into space 4 in a radial direction but is directed along passages 7 in wall 8 of the box and enters the space 4 at each end thereof.

The disposition of the passages 7 may best be seen in FIGURE 2.

With the arrangement shown the electrical leakage path between the conductors and the earthed ferrule 6 can be made sufficient to reduce the leakage current to a low value.

The disposition of the manifold boxes 2 around the end of the stator is shown in FIGURE 3, connecting pipes 9 being provided which supply liquid to the individual boxes from headers 10, 11. Both headers can be inlet headers; both outlet headers or one can be an inlet header and the other an outlet header depending on the direction of flow through the conductors associated with the individual boxes.

Because of the leakage path in the box itself the pipe connections 9 and the ferrules 6 may be of metal and a robust construction obtained.

As indicated above the inlet and outlet boxes for the conductors may be at the same end of the stator.

I claim:

In a stationary winding for a dynamo-electric machine comprising hollow conductors housed in slots in a stator core, end portions of the conductors located outside the core, a plurality of boxes of electrical insulating material located at and supporting the conductor ends, means supplying a cooling liquid to boxes at one end of the conductors and collecting it from boxes at the other end of said conductors after circulation through or over said conductors, the provision in each box of at least one opening in an outer face and at least one opening in an inner face, the latter opening being displaced from the opening in the outer face and providing a passage in the wall of the box interconnecting said openings whereby the length of the electrical leakage path via cooling liquid passing through the wall of the box is substantially greater than the thickness of the box.

References Cited in the file of this patent

UNITED STATES PATENTS

| | | |
|---|---|---|
| 2,722,616 | Moses | Nov. 1, 1955 |
| 2,727,161 | Kilner | Dec. 13, 1955 |
| 2,780,739 | Baudry | Feb. 5, 1957 |
| 2,897,382 | Hamill | July 28, 1959 |